(12) United States Patent
Kim

(10) Patent No.: US 12,330,165 B2
(45) Date of Patent: Jun. 17, 2025

(54) FOOD WASTE DISPOSAL APPARATUS

(71) Applicant: Yun Uk Kim, Seoul (KR)

(72) Inventor: Yun Uk Kim, Seoul (KR)

(73) Assignee: Yun Uk Kim, Seoul (KR)

( * ) Notice: Subject to any disclaimer, the term of this patent is extended or adjusted under 35 U.S.C. 154(b) by 201 days.

(21) Appl. No.: 17/912,820

(22) PCT Filed: Mar. 4, 2021

(86) PCT No.: PCT/KR2021/002668
§ 371 (c)(1),
(2) Date: Sep. 19, 2022

(87) PCT Pub. No.: WO2021/194121
PCT Pub. Date: Sep. 30, 2021

(65) Prior Publication Data
US 2023/0173503 A1     Jun. 8, 2023

(30) Foreign Application Priority Data

Mar. 26, 2020 (KR) .................. 10-2020-0037171

(51) Int. Cl.
B02C 18/00    (2006.01)
B02C 17/18    (2006.01)
B09B 3/40     (2022.01)

(52) U.S. Cl.
CPC ............ B02C 18/0084 (2013.01); B09B 3/40 (2022.01); *B02C 2201/06* (2013.01)

(58) Field of Classification Search
CPC . B02C 18/0084; B02C 18/0092; B02C 23/38; B02C 23/40; B02C 23/24
See application file for complete search history.

(56) References Cited

U.S. PATENT DOCUMENTS

| | | | | |
|---|---|---|---|---|
| 5,129,590 A | * | 7/1992 | Shinya | B30B 9/128 210/174 |
| 5,377,921 A | * | 1/1995 | Wirth | C05F 17/90 241/DIG. 38 |
| 5,980,823 A | * | 11/1999 | Nekozuka | A61L 9/16 422/4 |
| 8,267,339 B2 | * | 9/2012 | Park | E03C 1/2665 241/73 |

(Continued)

FOREIGN PATENT DOCUMENTS

| | | | | |
|---|---|---|---|---|
| CN | 105032894 A | * | 11/2015 | ............. A61L 11/00 |
| KR | 100235631 B1 | * | 12/1999 | ......... B02C 18/0092 |

(Continued)

*Primary Examiner* — Christopher L Templeton
*Assistant Examiner* — Adam Anthony Centanni
(74) *Attorney, Agent, or Firm* — NKL Law; Jae Youn Kim

(57) ABSTRACT

Proposed is a food waste disposal apparatus for automatically discharging food waste by compressing (naturally dewatering), cutting, and drying food waste. More specifically, proposed is a food waste disposal apparatus having a corrugated part provided at an input hole so that same can be bent in all directions, and thus construction is facilitated, and having, at a predetermined distance away from a drying drum that generates high heat, an exhaust fan for discharging internal air of a drying and discharging part, so as to minimize breakdown of the exhaust fan caused by high heat, and enable vibration and noise of the exhaust fan to be prevented.

12 Claims, 16 Drawing Sheets

(56) References Cited

U.S. PATENT DOCUMENTS

| | | | | |
|---|---|---|---|---|
| 8,448,886 B2 * | 5/2013 | Santandrea | ......... | B02C 18/0084 |
| | | | | 241/46.013 |
| 10,196,802 B2 * | 2/2019 | Park | ......................... | B07B 1/18 |

FOREIGN PATENT DOCUMENTS

| | | | | | |
|---|---|---|---|---|---|
| KR | 20070067843 | A | * | 12/1999 | ......... B02C 18/0092 |
| KR | 200345258 | Y1 | * | 3/2004 | ......... B02C 18/0084 |
| KR | 20040088116 | A | * | 10/2004 | ......... B02C 18/0092 |
| KR | 20050083194 | A | * | 8/2005 | ......... B02C 18/0092 |
| KR | 20070013932 | A | | 1/2007 | |
| KR | 100734423 | B1 | | 7/2007 | |
| KR | 20070082336 | A | * | 8/2007 | ............. B02C 18/12 |
| KR | 100963659 | B1 | | 6/2010 | |
| KR | 100964282 | B1 | * | 6/2010 | ......... B02C 18/0092 |
| KR | 20100104584 | A | * | 9/2010 | ............. B02C 19/22 |
| KR | 101112491 | B1 | * | 2/2012 | ......... B02C 18/0092 |
| KR | 101445693 | B1 | | 10/2014 | |
| KR | 101454478 | B1 | * | 10/2014 | ............. B02C 19/22 |
| KR | 101471908 | B1 | * | 12/2014 | ......... B02C 18/0092 |
| KR | 20200006463 | A | | 1/2020 | |
| WO | WO-2008150059 | A1 | * | 12/2008 | ......... B02C 18/0092 |

\* cited by examiner

FOOD WASTE DISPOSAL APPARATUS

CROSS-REFERENCES TO RELATED APPLICATIONS

This application is a 371 application of PCT/KR2021/002668 filed Mar. 4, 2021, which claims priority to KR 10-2020-0037171 filed Mar. 26, 2020, the entire disclosure of which is incorporated herein by reference.

TECHNICAL FIELD

The present disclosure relates to a food waste disposal apparatus for automatically discharging food waste by compressing (naturally dewatering), cutting, and drying food waste. More specifically, the present disclosure relates to a food waste disposal apparatus having a corrugated part provided at an input hole so that same can be bent in all directions, and thus construction is facilitated, and having, at a predetermined distance away from a drying drum that generates high heat, an exhaust fan for discharging internal air of a drying and discharging part, so as to minimize breakdown of the exhaust fan caused by high heat, and enable vibration and noise of the exhaust fan to be prevented.

BACKGROUND ART

As food waste is generated in kitchens of general homes and restaurants, interest in food waste disposal is increasing.

Such food waste is collected after being gathered in a standard garbage bag or a collecting container. However, there are problems that an unpleasant odor of food waste is generated, a location around the food waste is unclean and unsanitary since moisture of the food waste is leaked, and the surroundings dirty are unsanitary, and the food waste causes discomfort since the food waste is visually unpleasant.

In order to solve these problems, technologies for increasing treatment effect of food waste by cutting, compressing (naturally dewatering), and drying the food waste have been proposed. In Korean Patent Application Publication No. 2004-0045087 (EQUIPMENT FOOD AND TRASH OF A SINK STICK), there is provided a technology of discharging food waste to the outside after compressing (naturally dewatering), cutting, and drying the food waste, the technology including: an input port 10 having a center of a lower end provided with a first drainage aperture and having a first side around the first drainage aperture provided with a second drainage aperture that is configured to be in communication with a plurality of holes; a first transferring screw 20 configured to be rotated inside a screw cover by driving a first motor; a second motor 30 which is provided at an upper end of a bracket that is fixed to a first side of an upper portion of a plate and which is configured to rotate a first gear by driving a gearbox; a compressing and cutting part 40 which is engaged with the first gear so that the compressing and cutting part 40 is rotated together with the first gear and which is configured to compress (naturally dewatering) and then cut food waste that is introduced into an inner portion thereof through the first transferring screw; and a drying and discharging part 50 which is provided at a first side of the compressing and cutting part 40 and which is configured to dry and discharge the food waste that is compressed (naturally dewatering) and cut.

However, a conventional food waste disposal apparatus has a very complex structure, so that there is a problem that a component is difficult to be replaced when breakdown of the conventional food waste disposal apparatus occurs.

In addition, in a situation in which food waste is filled inside an inlet port and a water container due to breakdown of an apparatus or overfilling of food waste, there is a problem that water backflows into a sink or flows out of the apparatus when water is used.

In order for solving these problems, Korean Patent No. 10-1445693 (title: FOOD GARBAGE DISPOSER), which has been filed prior to the present application and registered, has been provided. Such a food garbage disposer includes an input port, a horizontal transferring screw, a flow rate control connector, a compressing, transferring, and cutting part, and a drying and discharging part, and is configured to discharge food waste and to remove odor by compressing (naturally dewatering), cutting, drying the food waste.

However, in the food garbage disposer in Korean Patent No. 10-1445693, a chain gear mounted on a shaft of a vertical transferring screw included in the compressing (naturally dewatering), transferring, and cutting part, a chain gear mounted on a shaft of a transferring wing, and a chain gear mounted on a shaft of a driving motor are driven while being connected to one chain. Therefore, when overload is applied on any one of the chain, connected portions are shaken by vibration, so that deformation of components and so on occurs. Furthermore, the vertical transferring screw and the transferring wing are not smoothly rotated, and a situation in which food waste is not properly cut and the vertical transferring screw and the transferring wing are stuck in the food waste occurs.

In addition, since a rotary shaft which is included in the drying and discharging part and on which a stirring bridge is mounted and rotated is driven while being in directly connected to the driving motor, heat of the rotary shaft heated by a heater is directly transferred to the driving motor, so that there is a problem that breakdown of driving motor occurs due to overload of the driving motor.

In addition, the food garbage disposer is difficult to remove water vapor containing odor generated when food waste containing moisture above 80% is dried.

In addition, since an exhaust fan that discharge high temperature air discharged from the drying and discharging part is positioned adjacent to the drying and discharging part, there are big problems that high temperature heat is applied to the exhaust fan, the exhaust fan is easily broken down since the exhaust fan is in contact with the food waste, and also high vibrational noise is generated.

In addition, since a hopper part is provided in a fixed state, there is a problem that construction of the hopper part is difficult.

DOCUMENT OF RELATED ART (Patent Document 1) Korean Patent No. 10-1445693

DISCLOSURE

Technical Problem

Accordingly, the present disclosure has been made keeping in mind the above problems occurring in the related art, and an objective of the present disclosure is to provide a food waste disposal apparatus capable of automatically discharging food waste by compressing (naturally dewatering), cutting, and drying the food waste.

Another objective of the present disclosure is to provide a food waste disposal apparatus having an input port provided with a corrugated part such that the corrugated part is capable of being bent in all directions, thereby being capable of being easily mounted according to working conditions.

Still another objective of the present disclosure is to provide a food waste disposal apparatus having an exhaust fan for discharging internal air of a drying and discharging part to be spaced apart by a predetermined distance from a drying container generating high temperature heat, thereby being capable of minimizing breakdown of the exhaust fan caused by high temperature heat and being also capable of preventing vibration and noise of the exhaust fan.

Technical Solution

In order to achieve the above objectives, according to the present disclosure, there is provided a food waste disposal apparatus including: a hopper part including an input part having an input hole into which food waste is input and having a drainage hole to which water is discharged, the hopper part including a discharge pipe having a first discharge part connected to the input part and configured to discharge the food waste and having a second discharge part configured to discharge water, the discharge pipe having an outer circumference provided with a corrugated part that has a spiral shape such that the discharge pipe is capable of being bent in all directions; a first transferring part provided at a lower portion of the hopper part and configured to be rotated by driving a first motor, the food waste being introduced into the hopper part, thereby moving the food waste in a horizontal direction; a compressing, transferring, and cutting part configured to compress the food waste introduced therein through the first transferring part, to move the food waste in a vertical direction, and to cut the food waste; a drying and discharging part configured to dry and discharge the food waste which is compressed (naturally dewatering) and cut and which is introduced therein through the compressing, transferring, and cutting part; an air discharging part configured to transfer water vapor and odor that are generated in the drying and discharging part to a deodorizing part; a deodorizing and exhausting part configured to remove the water vapor and the odor that are introduced through the air discharging part; and an odor cleaning part configured to purify and clean the deodorizing and exhausting part by supplying and spraying water to the deodorizing and exhausting part.

In addition, the hopper part may include: a first opening and closing lid which is coupled to an inner side of the input part such that the first opening and closing lid is capable of being fixed to or released from the input part by a locking means and which is configured to open and close the input hole; a waste receiving drum mounted in the input hole of the input part and configured to accommodate the food waste; and a second opening and closing lid configured to open and close an opened upper portion of the input part, and the locking means may include: a locking protrusion that protrudes on an outer border of the first opening and closing lid; and a locking groove formed in an inner circumference of the input hole such that the locking protrusion is capable of being inserted into or separated from the locking groove according to left and right rotation directions.

In addition, the hopper part may include a control means that is capable of automatically controlling the food waste disposal apparatus in a standby mode, and the control means may include: a magnet part mounted on a lower end portion of the first opening and closing lid; and a magnetic force detecting sensor mounted on a lower end portion of the input part and configured to detect a magnetic force of the magnet part.

In addition, the compressing, transferring, and cutting part may include: an accommodating container having a first accommodating part in which the food waste discharged from the first discharge part is accommodated and which has a lower end portion provided with a mounting hole, the accommodating container having a second accommodating part in which water discharged from the second discharge part is accommodated, and the accommodating container having a partitioning wall formed between the first accommodating part and the second accommodating part; a horizontal transferring screw which is mounted in the mounting hole of the first accommodating part in the horizontal direction and which is configured to transfer the food waste to the second accommodating part; a vertical transferring screw which is axially mounted in an inner bottom surface of the second accommodating part in the vertical direction and which is configured to transfer the food waste transferred to the second accommodating part in an upward direction; a transferring cover part which is configured such that the transferring cover part surrounds an outer side of the vertical transferring screw and which is configured to guide the food waste to be smoothly transferred upward by a rotational force of the vertical transferring screw; a cutting part which is disposed at an upper portion of the vertical transferring screw and which is configured to cut the food waste that is transferred upward through the vertical transferring screw; an accommodating container cover part which covers an opened upper portion of the accommodating container and which has a transferring wing cover and a discharge pipe connection hole; a transferring wing which is axially mounted inside the transferring wing cover of the accommodating container cover part and which is configured to transfer the food waste to the drying and discharging part; and a first rotation driving part configured to rotate the vertical transferring screw and the transferring wing.

In addition, the cutting part may include: a first cutter which is mounted on an upper end of a shaft of the vertical transferring screw and which is configured to be rotated together with the vertical transferring screw; and a second cutter fixed and mounted in a cutter mounting groove that is formed on an upper inner border of the transferring cover part.

In addition, a plurality of guide reinforcing ribs may be formed along a longitudinal direction of an outer side surface of the accommodating container, in which the plurality of guide reinforcing ribs is capable of guiding a long bolt that is for fixing the accommodating container to be smoothly bolt-fastened, and the plurality of guide reinforcing ribs is also capable of reinforcing a supporting force of the long bolt.

In addition, the drying and discharging part may include: a first drying drum having a center of a bottom surface provided with a first discharge hole through which the food waste is discharged, the first drying drum having a lower end portion provided with a first heater heating the food waste; a second drying drum having a center of an inner bottom surface provided with a mounting groove in which a rotary shaft is mounted, the second drying drum having a ventilation aperture through which air flows provided at an outer periphery of the mounting groove, the mounting groove having a first side provided with a second discharge hole through which the food waste is discharged, and the second drying drum having a lower end portion provided with a second heater heating the food waste; the rotary shaft vertically and axially mounted in the mounting groove of the second drying drum such that the rotary shaft is capable of being rotated; a second rotation driving part configured to rotate the rotary shaft; a stirring means including a first stirring member which is mounted on an upper portion of the rotary shaft and provided inside the first drying drum and which is configured to stir the food waste, the stirring means including a second stirring member which is mounted on a lower portion of the rotary shaft and provided inside the second drying drum and which is configured to stir again the food waste that is discharged from the first drying drum; a drying drum cover part which covers an opened upper end of the first drying drum and which has a first side of an upper end portion provided with an air discharging port, the air discharging port having a lower end provided with a rotation catching step; and an opening and closing means which is provided with an opening and closing plug that opens and closes the second discharge hole of the second drying drum and which is provided with a fourth motor configured to rotate the opening and closing plug.

In addition, a backflow prevention plate which is capable of being rotated and which is configured to prevent the food waste stirred inside the first drying drum from backflowing to the air discharging port may be provided at the rotation catching step of the drying drum cover part.

In addition, the drying and discharging part may be provided with a temperature sensor part for automatically controlling temperatures of the first heater and the second heater.

In addition, the drying and discharging part may include an opening and closing control means for automatically controlling an operation of the opening and closing means, and the opening and closing control means may include: a sensor detecting member which is configured to be rotated by being fixed and coupled to an upper end portion of the rotary shaft and which has a border provided with a sensor detecting part and a sensor non-detecting part; and a motor control sensor which is provided at an upper portion of the drying drum cover part and which is configured to drive a motor of the opening and closing means as the sensor detecting part of the sensor detecting member is detected.

In addition, the air discharging part may include: a first air discharging pipe having a first end portion connected to the drying and discharging part and having a second end portion provided with a first coupling port; a second air discharging pipe having a first end portion connected to the deodorizing and exhausting part and having a second end portion provided with a second coupling port that is coupled to the first coupling port; and an exhaust fan provided between the first coupling port and the second coupling port.

In addition, the deodorizing and exhausting part may include: a deodorizing means connected to a second air discharging pipe of the drying and discharging part and configured to discharge introduced high temperature water vapor containing odor after the deodorizing means sprays water to the introduced high temperature water vapor containing the odor so that the introduced high temperature water is condensed, purified, and cleaned, thereby removing the odor; and an exhaust means connected to the deodorizing means and configured to remove the odor again by discharging air introduced from deodorizing means to an outside after purifying the air with a filter.

In addition, the odor cleaning part may include: a water supplying hose configured to supply water; a solenoid valve configured to open and close a flow path of the water supplying hose; and a spray nozzle configured to spray water supplied through the solenoid valve into a deodorizing means.

Advantageous Effects

According to the present disclosure, since the corrugated part is provided at the input port such that the corrugated part is capable of being bent in all directions, the food waste disposal apparatus capable of being easily mounted according to working conditions may be provided.

In addition, since the operating means including the magnet part and the magnetic force detecting sensor are provided, the food waste disposal apparatus in the standby mode may be automatically operated.

In addition, since the deodorizing and exhausting part including the deodorizing means and the exhaust means is provided and high temperature water vapor containing odor generated from the drying and discharging part is condensed and discharged by spraying water to the water vapor, water vapor and odor are firstly removed, and air (removing odor) remaining in the deodorizing means is removed again by purifying the air (removing odor) with the filter and discharging the air (removing odor) to the outside, so that odor may be completely removed and also water vapor may be prevented from being generated in the sink.

In addition, since the odor cleaning part is provided and water mist is sprayed into the deodorizing means through the spray nozzle, odor is collected and water vapor is condensed and discharged, so that odor is removed and also a dew condensation situation caused by high temperature water vapor is prevented from occurring inside the sink.

In addition, since the air discharging part is provided and the exhaust fan for discharging internal air of the drying and discharging part is provided to be spaced apart by a predetermined distance from the drying container that generates high temperature heat, breakdown of the exhaust fan caused by high temperature heat may be minimized and also vibration and noise of the exhaust fan may be prevented.

DESCRIPTION OF REFERENCE NUMERALS

Figure 1:
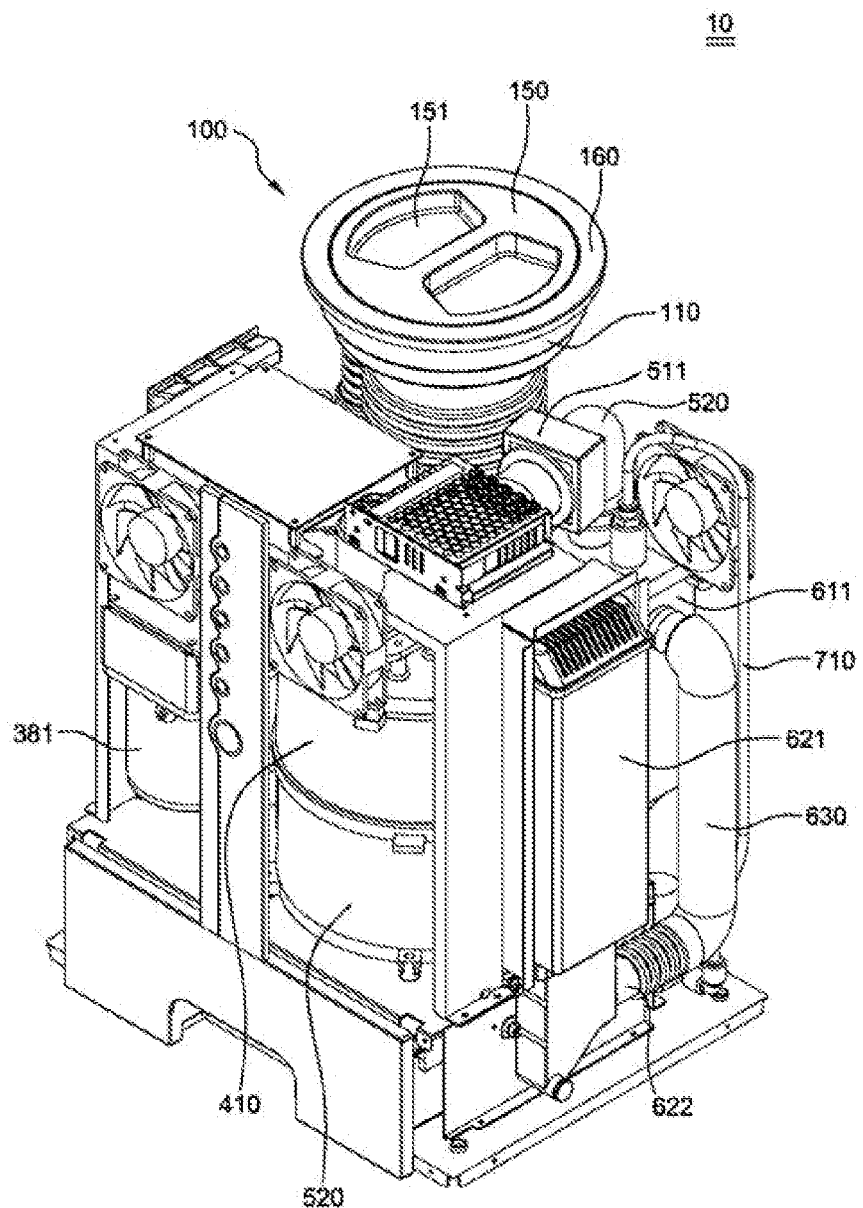
FIG. 1 is a perspective view illustrating the overall appearance of a food waste disposal apparatus according to the present disclosure.

100: hopper part
110: input part 111: input hole 112: drainage hole
120: discharge pipe 121: first discharge part 122: second discharge part 123: corrugated part
130: first opening and closing lid 131: handle protrusion
140: waste receiving drum 141: rotation handle 142: drainage aperture
150: second opening and closing lid 151: handle groove
160: sealing member
170: locking means 171: locking protrusion 172: locking groove
180: operating means 181: magnet part 182: magnetic force detecting sensor
200: first transferring part
210: horizontal transferring screw
220: first motor
300: compressing, transferring, and cutting part
310: accommodating container 311: first accommodating part 311a: mounting hole
312: second accommodating part 313: partitioning wall 313a: water overflowing prevention groove
314: guide reinforcing rib 315: drainage pipe
320: horizontal transferring screw
330: vertical transferring screw
340: transferring cover part 341: guide cover 341a: cutter mounting groove
341b: guide rail 341c: sealing member 342: dewatering cover
342a: connection hole 342b: dewatering aperture
350: cutting part 351: first cutter 352: second cutter 352a: cutting protrusion piece
352b: cutting surface
360: accommodating container cover part 361: transferring wing cover 361a: discharge port
361b: inlet port 362: discharge pipe connection hole
370: transferring wing
380: first rotation driving part 381: second motor 382: first chain gear
382a: 1-1 chain gear 382b: 1-2 chain gear 383: second chain gear
384: third chain gear 385: first chain 386: second chain 387: shaft fixing plate
390: damage prevention plate
400: drying and discharging part
410: first drying drum 411: first discharge hole 412: first heater
413: first cutting protrusion 414: second cutting protrusion
420: second drying drum 421: mounting groove 422: ventilation aperture 423: second discharge hole
424: second heater
430: rotary shaft
440: second rotation driving part 441: third motor 442: first shaft gear
443: second shaft gear
450: stirring means 451: first stirring member 451a: first stirring wing
452: second stirring member 452a: plug part 452b: second stirring wing
452b-1: vertical protrusion 452b-2: horizontal protrusion
460: drying drum cover part 461: air discharging port 462: rotation catching step
463: backflow prevention plate 463a: air discharging aperture
470: opening and closing means 471: opening and closing plug 472: fourth motor
480: temperature sensor part 481: temperature control sensor 482: auxiliary sensor
490: opening and closing control means 491: sensor detecting member 491a: sensor detecting part
491b: sensor non-detecting part 492: motor control sensor
500: air discharging part
510: first air discharging pipe 511: first coupling port 512: length control part
520: second air discharging pipe 521: second coupling port 522: length control part
530: exhaust fan
600: deodorizing and exhausting part
610: deodorizing means 611: deodorizing and removing container 612: water vapor inlet port
613: spray nozzle connection port 614: water discharging port 615: air discharging port
620: exhaust means 621: exhausting and purifying container 622: air inlet port
623: purifying filter 624: air discharging port
630: connection pipe 631: corrugated part
700: odor cleaning part
710: water supplying hose
720: solenoid valve
730: spray nozzle
800: collecting container
900: cooling fan

BEST MODE

Since the present disclosure may be variously modified and have several exemplary embodiments, specific exemplary embodiments will be shown in the accompanying drawings and be described in detail in a detailed description.

However, it should be understood that the specific embodiments according to the concept of the present disclosure are not limited to the embodiments which will be described hereinbelow with reference to the accompanying drawings, but all of modifications, equivalents, and substitutions are included in the scope and spirit of the present disclosure. Throughout the accompanying drawings, similar reference numerals will be used to describe similar components.

Terms including "first" and/or "second" may be used to describe various components, but the components are not to be construed as being limited to the terms.

The terms are only used to differentiate one component from other components. For example, the "first" element may be named the "second" element without departing from the scope of the present disclosure, and the "second" element may also be similarly named the "first" element. A term 'and/or' includes a combination of a plurality of related described items or any one of the plurality of related described items.

When a component is referred to as being "connected" or "contacted" to another component, it should be understood that it may be directly connected or contacted to the other component, but other components may exist therebetween. On the other hand, when a component is referred to as being "directly connected" or "directly contacted" to another component, it should be understood that there is no other component therebetween. 121[ ] The terminology used herein is for the purpose of describing specific embodiments only and is not intended to limit the present disclosure. As used herein, the singular forms are intended to include the plural forms as well, unless the context clearly indicates otherwise. It is to be understood that terms such as "including", "having", etc. are intended to indicate the existence of the features, numbers, steps, actions, elements, components, or combinations thereof disclosed in the specification, and are not intended to preclude the possibility that one or more other features, numbers, steps, actions, elements, components, or combinations thereof may exist or may be added.

Unless defined otherwise, all terms used herein including technical or scientific terms have the same meanings as generally understood by a person having ordinary knowledge in the art to which the present disclosure pertains. The terms defined in general dictionaries are construed as having meanings consistent with the contextual meanings of the art, but not interpreted as ideal meanings or excessively formal meanings unless explicitly defined in the present application.

Hereinafter, an embodiment of the present disclosure will be described in detail with reference to the accompanying drawings.

Figure 2:
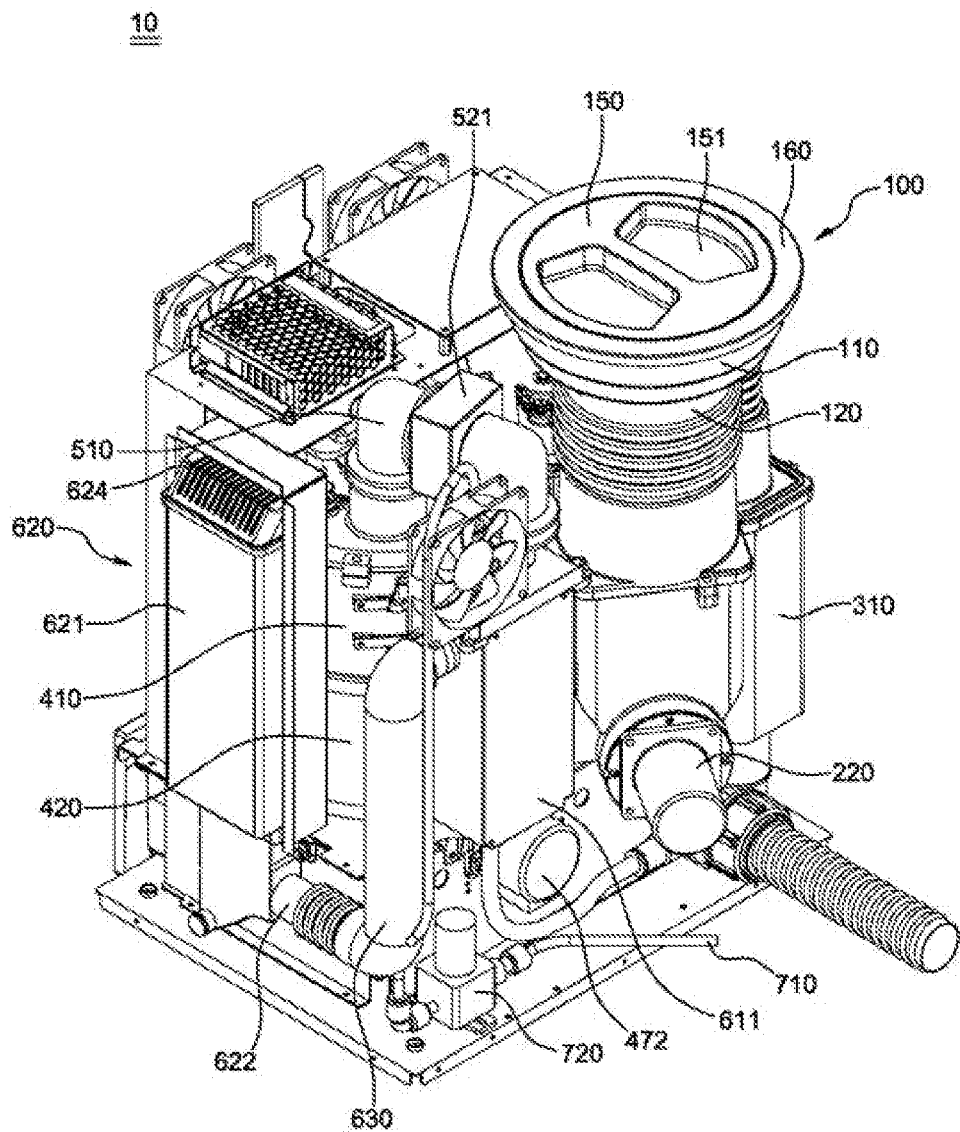
FIG. 2 is a perspective view of FIG. 1 viewed in another direction.
Figure 3:
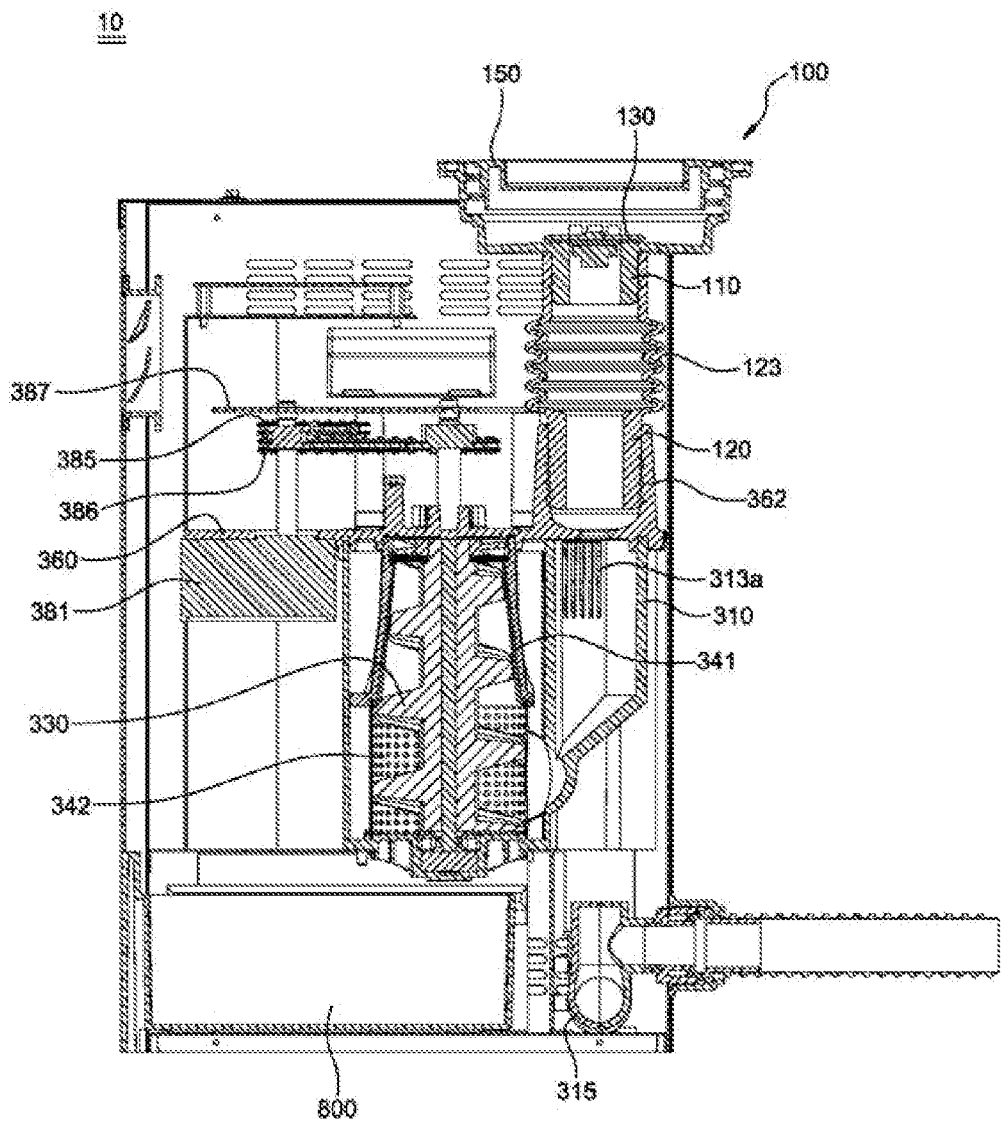
FIG. 3 is a cross-sectional view illustrating an internal structure of the food waste disposal apparatus according to the present disclosure in which a compressing, transferring, and cutting part is applied.
Figure 4:
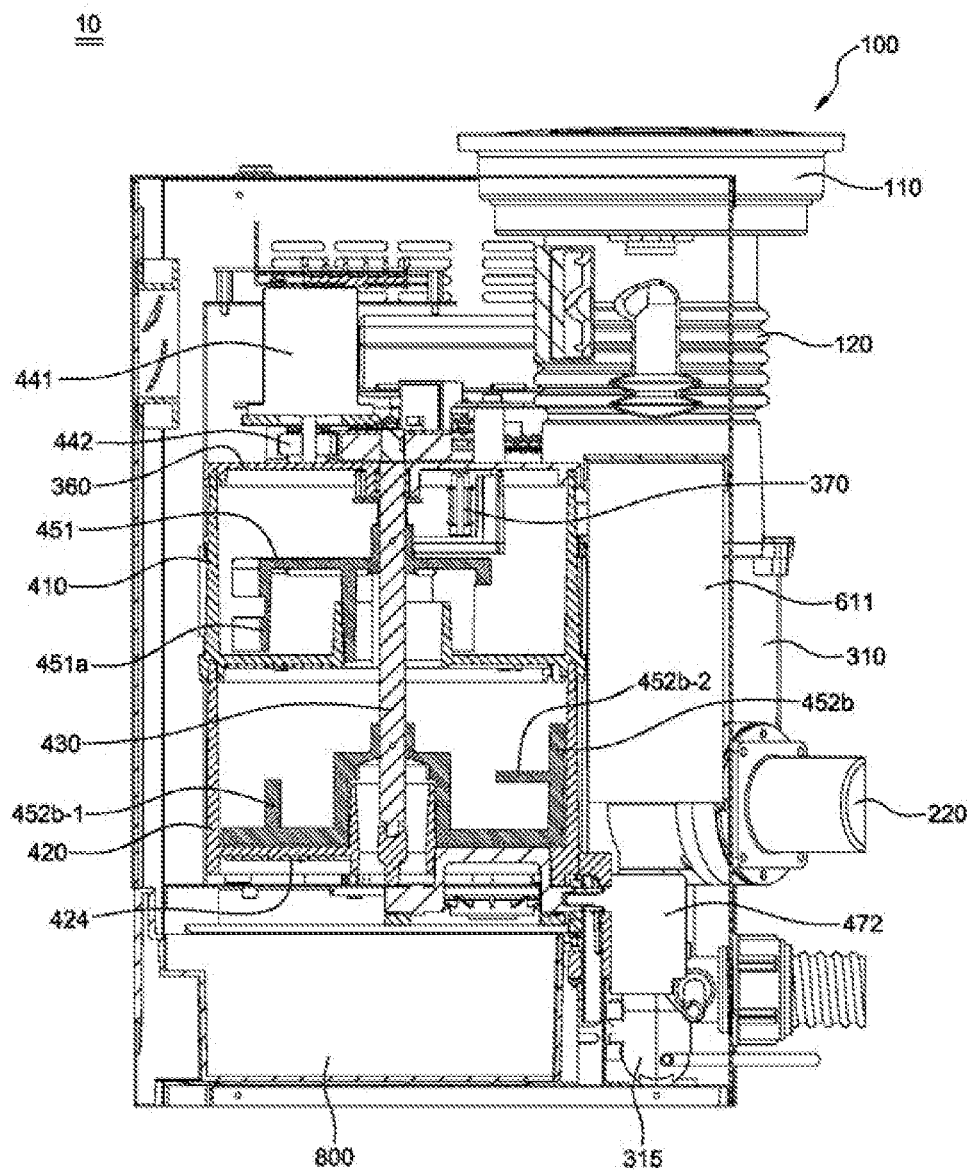
FIG. 4 is a cross-sectional view illustrating the internal structure of the food waste disposal apparatus according to the present disclosure in which a drying and discharging part is applied.
Figure 5:
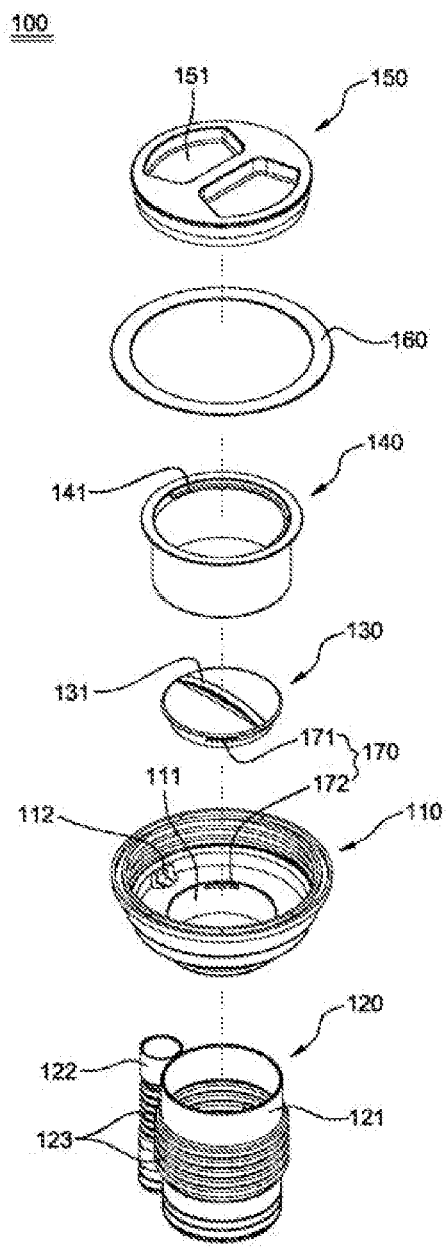
FIG. 5 is an exploded perspective view illustrating a hopper part applied in the present disclosure.
Figure 6:
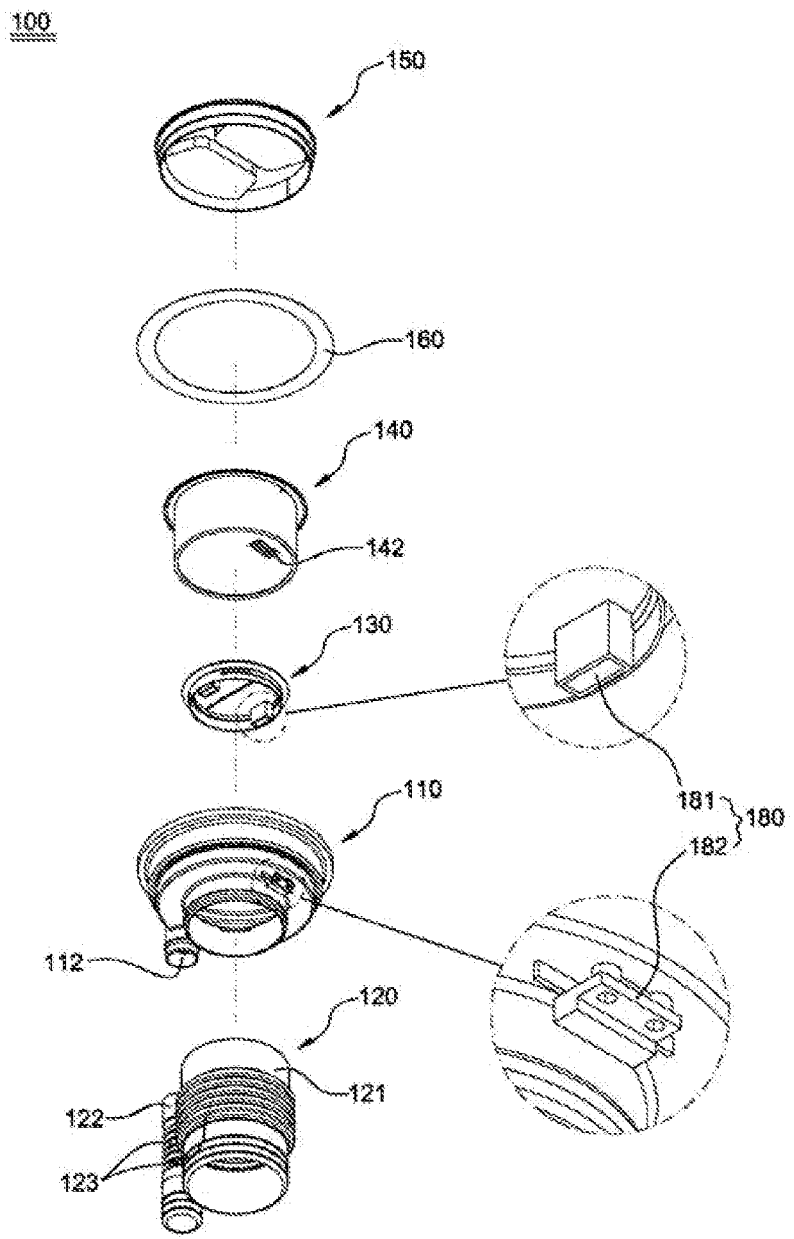
FIG. 6 is a bottom perspective view of FIG. 5.
Figure 7:
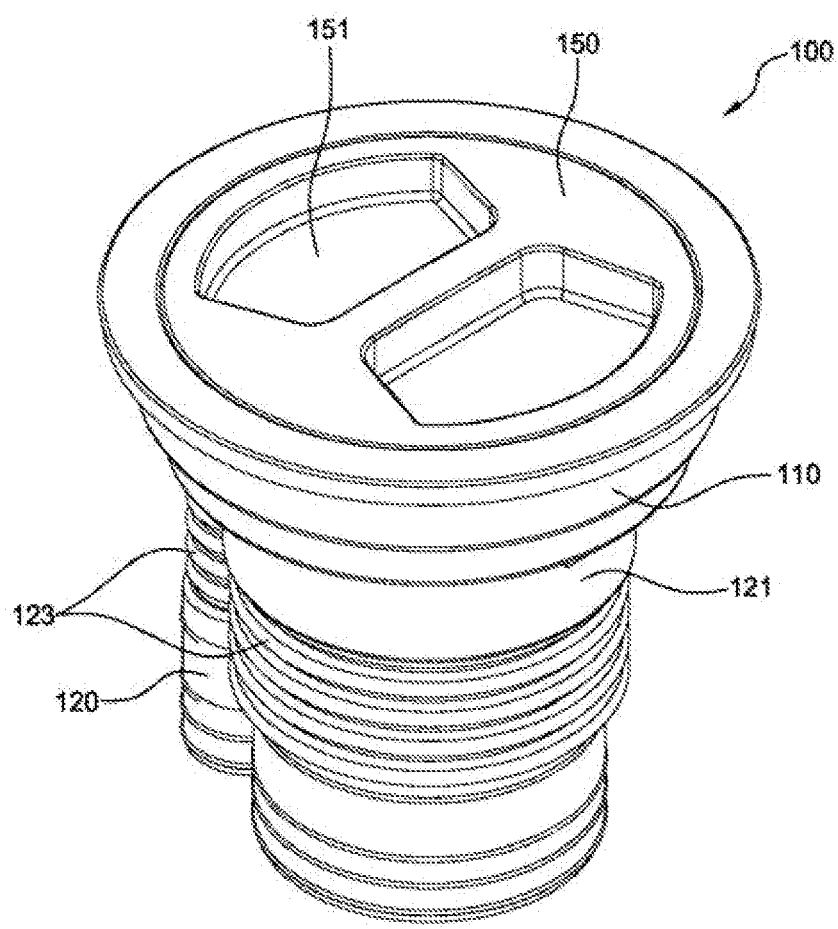
FIG. 7 is a coupled perspective view of FIG. 5.
Figure 8:
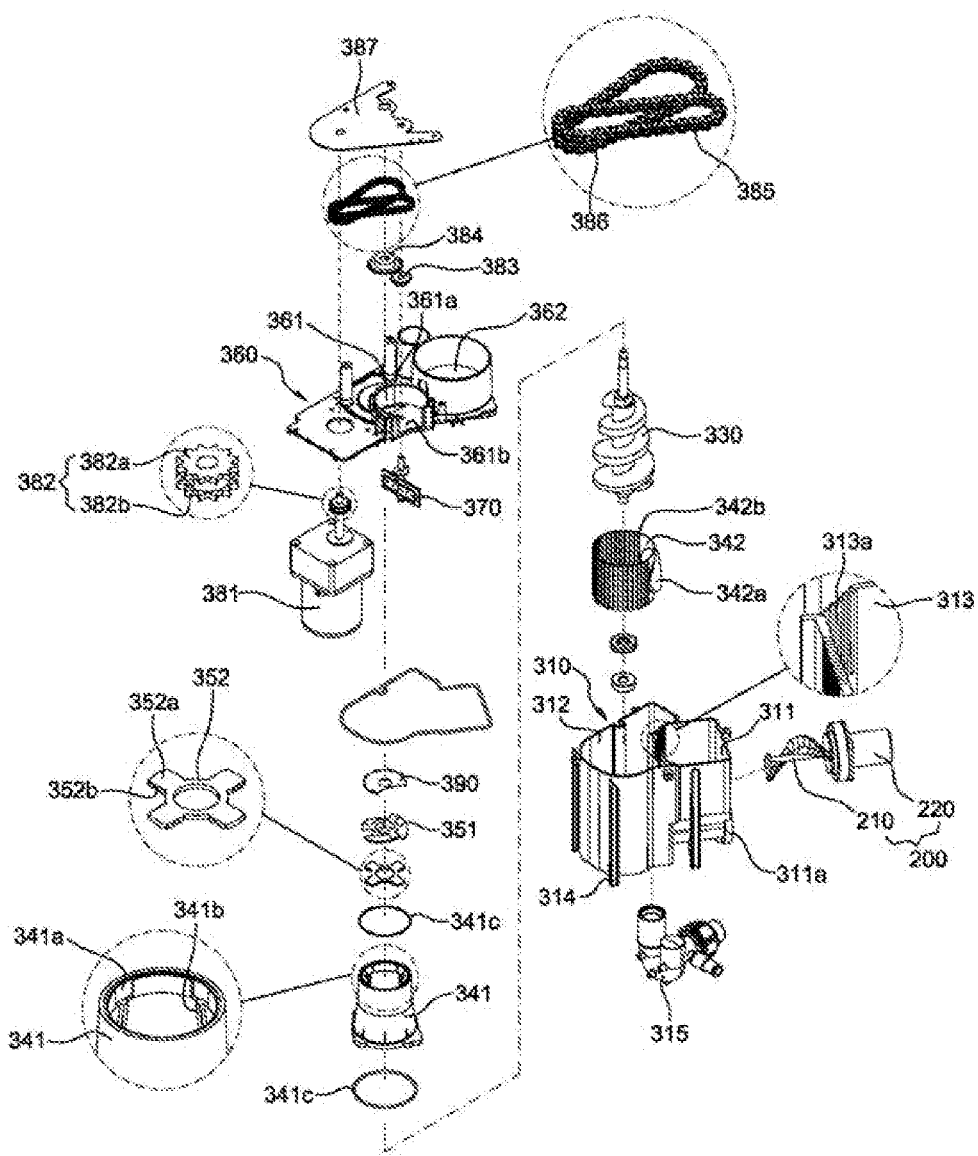
FIG. 8 is an exploded perspective view illustrating the compressing, transferring, and cutting part applied in the present disclosure.
Figure 9:
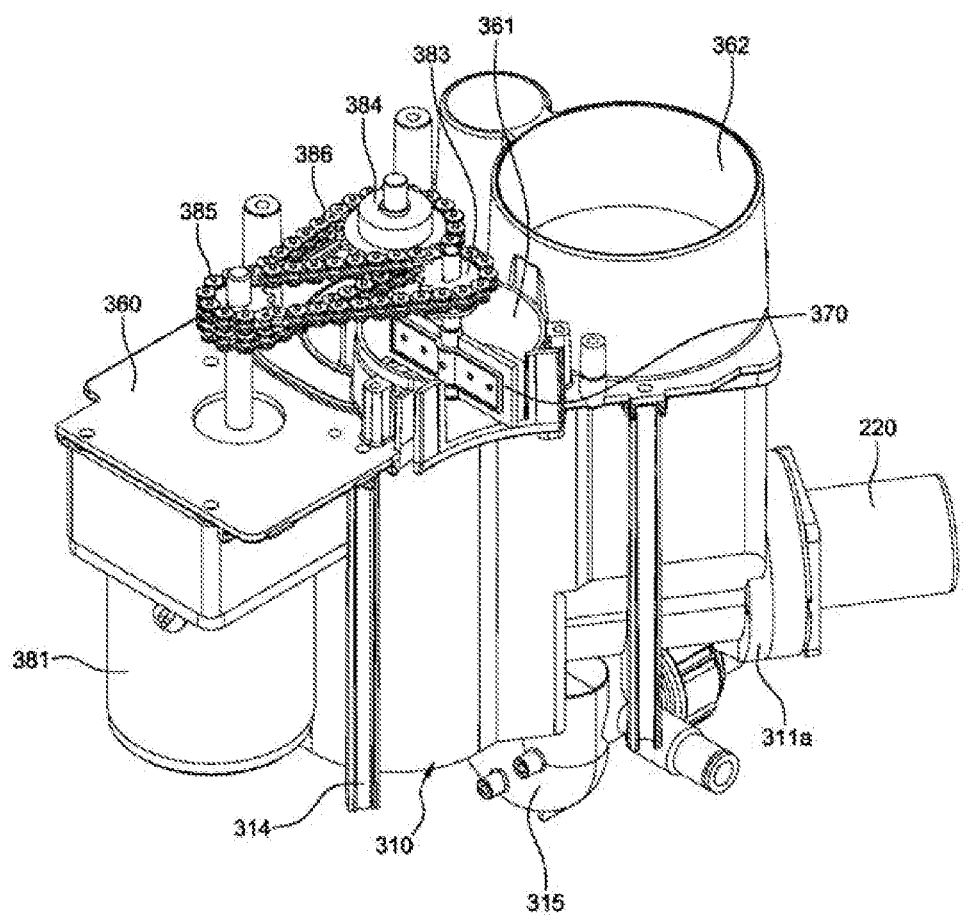
FIG. 9 is a coupled perspective view of FIG. 8.
Figure 10:
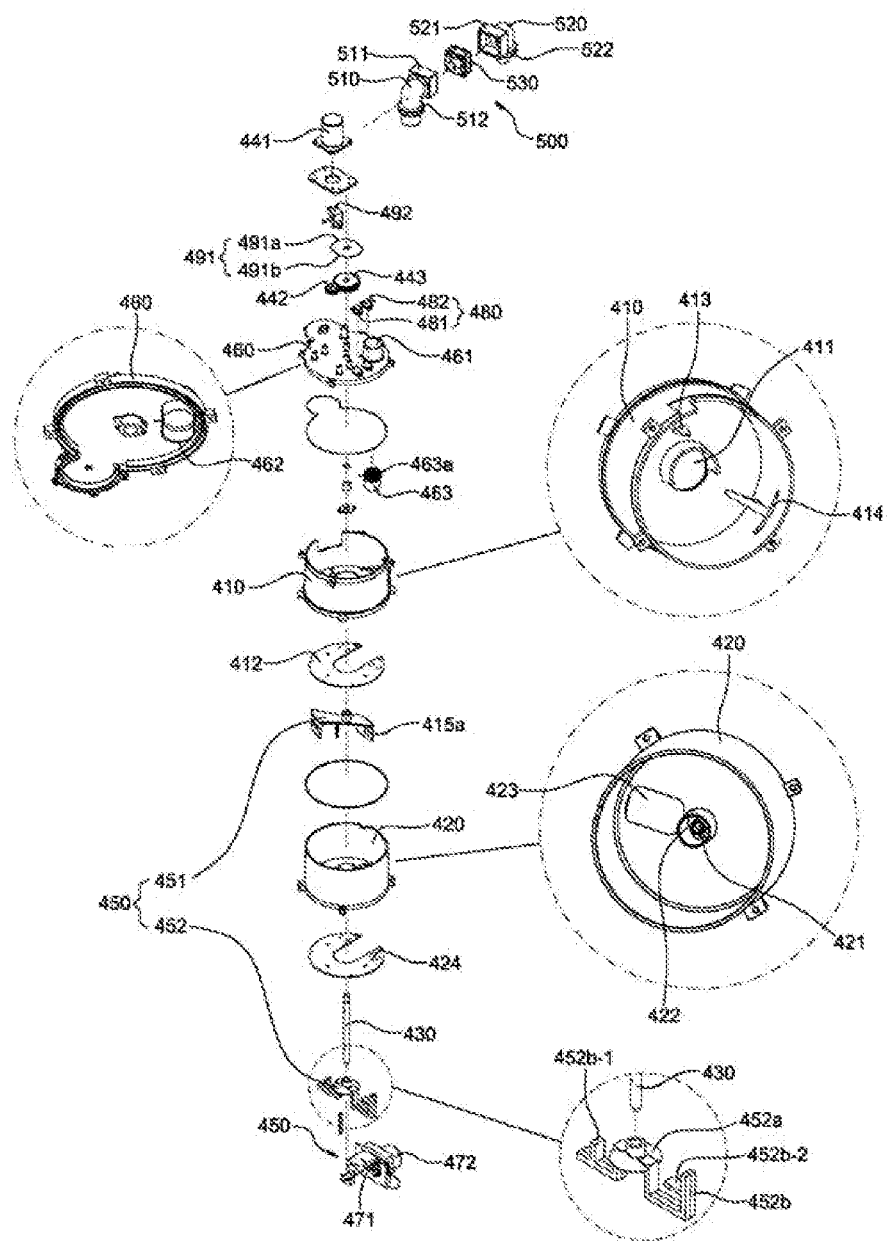
FIG. 10 is an exploded perspective view illustrating the drying and discharging part and an air discharging part that are applied in the present disclosure.
Figure 11:
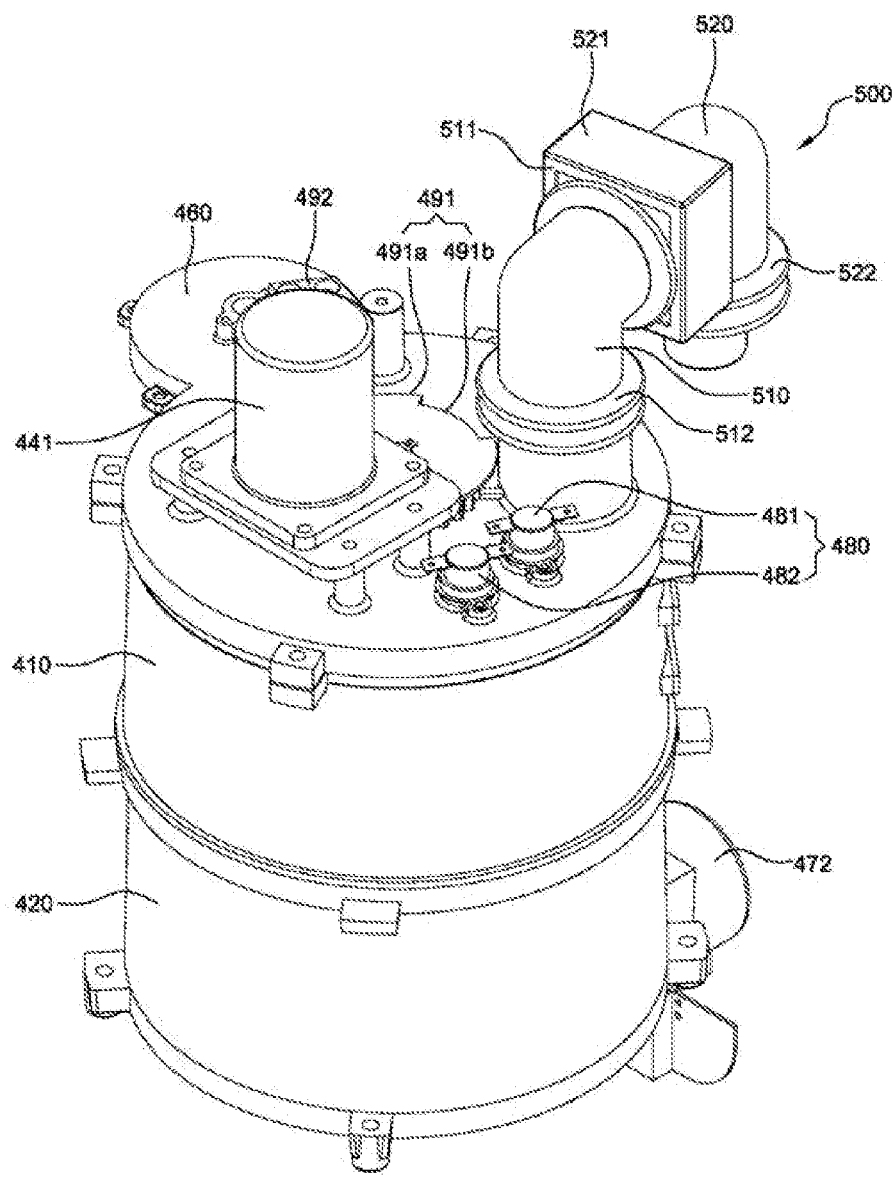
FIG. 11 is a coupled perspective view of FIG. 10.
Figure 12:
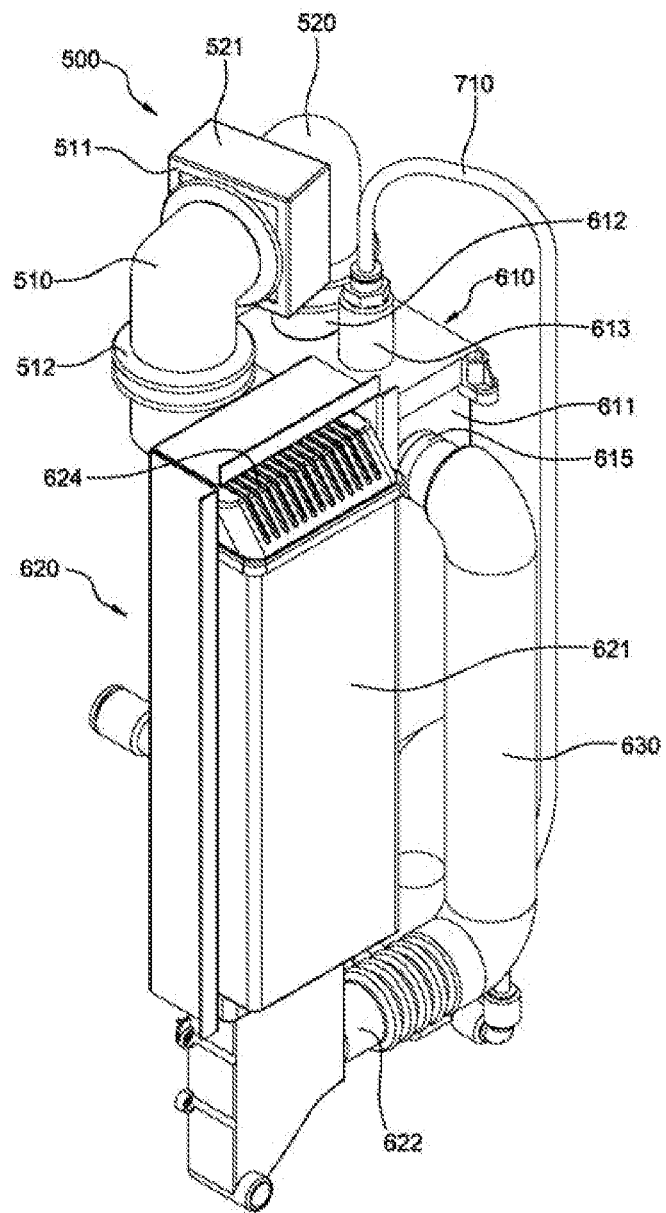
FIG. 12 is a perspective view illustrating a deodorizing and exhausting part applied in the present disclosure.
Figure 13:
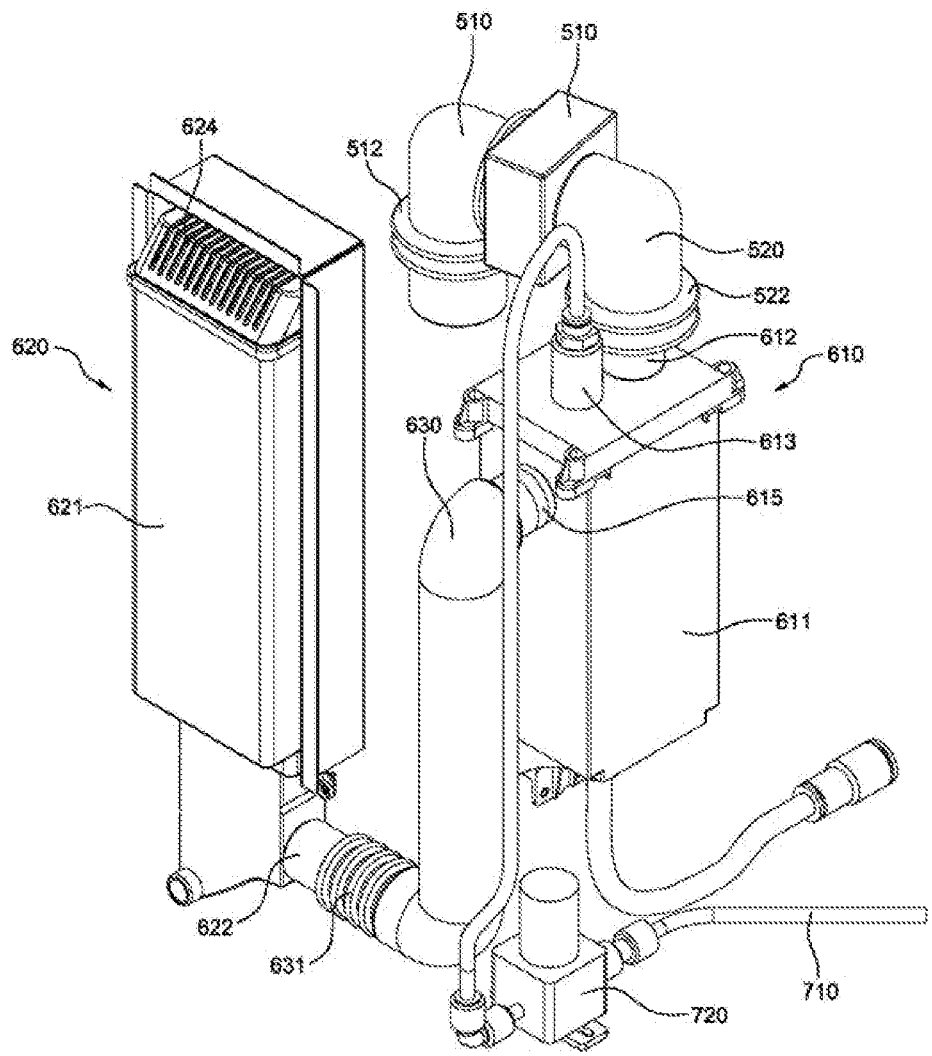
FIG. 13 is a perspective view of FIG. 12 viewed in another direction.
Figure 14:
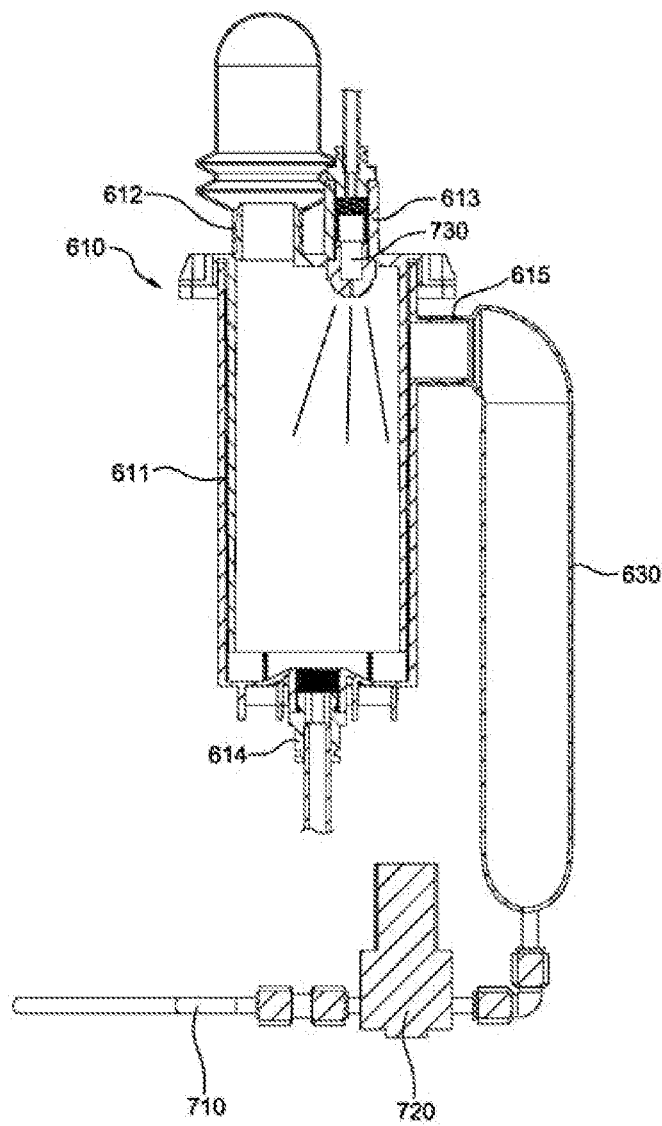
FIG. 14 is a cross-sectional view illustrating a deodorizing means applied in the present disclosure.
Figure 15:
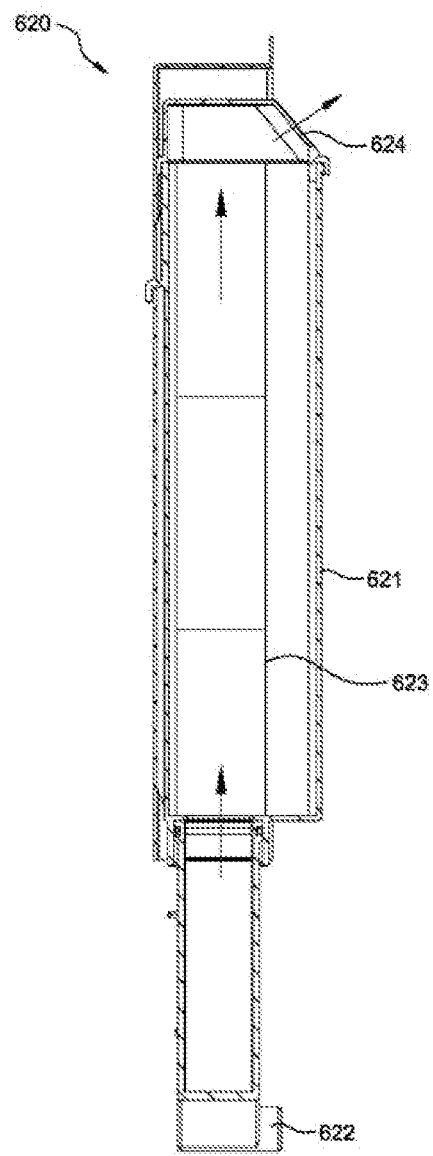
FIG. 15 is a cross-sectional view illustrating an exhaust means applied in the present disclosure.
Figure 16:
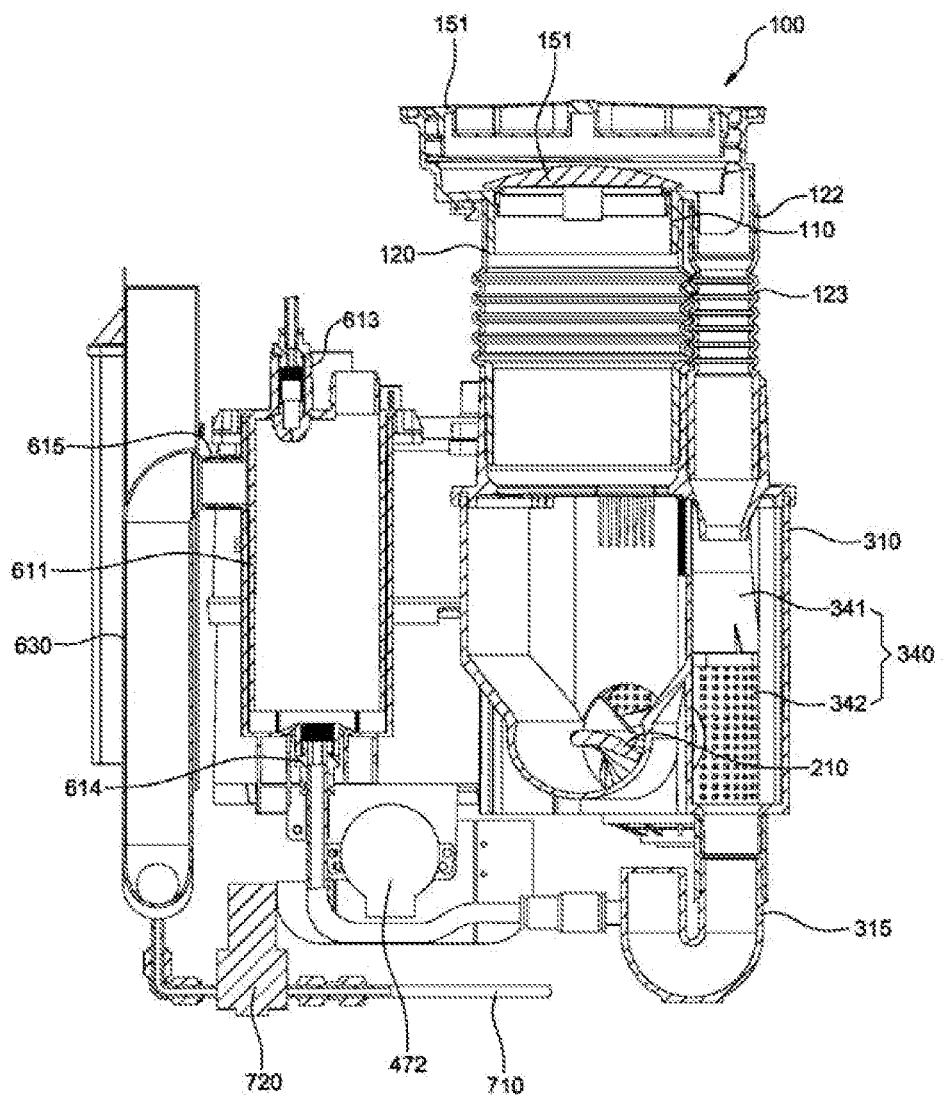
FIG. 16 is a cross-sectional view illustrating a state in which an odor cleaning part is applied in the food waste disposal apparatus according to the present disclosure.

FIG. 1 is a perspective view illustrating the overall appearance of a food waste disposal apparatus according to the present disclosure. FIG. 2 is a perspective view of FIG. 1 viewed in another direction. FIG. 3 is a cross-sectional view illustrating an internal structure of the food waste disposal apparatus according to the present disclosure in which a compressing, transferring, and cutting part is applied. FIG. 4 is a cross-sectional view illustrating the internal structure of the food waste disposal apparatus according to the present disclosure in which a drying and discharging part is applied. FIG. 5 is an exploded perspective view illustrating a hopper part applied in the present disclosure. FIG. 6 is a bottom perspective view of FIG. 5. FIG. 7 is a coupled perspective view of FIG. 5. FIG. 8 is an exploded perspective view illustrating the compressing, transferring, and cutting part applied in the present disclosure. FIG. 9 is a coupled perspective view of FIG. 8. FIG. 10 is an exploded perspective view illustrating the drying and discharging part and an air discharging part that are applied in the present disclosure. FIG. 11 is a coupled perspective view of FIG. 10. FIG. 12 is a perspective view illustrating a deodorizing and exhausting part applied in the present disclosure. FIG. 13 is a perspective view of FIG. 12 viewed in another direction. FIG. 14 is a cross-sectional view illustrating a deodorizing means applied in the present disclosure. FIG. 15 is a cross-sectional view illustrating an exhaust means applied in the present disclosure. FIG. 16 is a cross-sectional view illustrating a state in which an odor cleaning part is applied in the food waste disposal apparatus according to the present disclosure.

Referring to FIGS. 1 to 16, a food waste disposal apparatus 10, which is the present disclosure, will be described as follows.

The food waste disposal apparatus 10, which is the present disclosure, mainly includes a hopper part 100, a first transferring part 200, a compressing, transferring, and cutting part 300, a drying and discharging part 400, an air discharging part 500, and a deodorizing and exhausting part 600.

The hopper part 100 is assembled and mounted at a drainage port of a sink (not illustrated in the drawings) while being in an exposed state. As illustrated in FIGS. 5 to 7, such a hopper part 100 is provided with an input part 110 where an input hole 111 through which food waste is input and a drainage hole 112 through which water is discharged are formed.

In addition, the hopper part 100 is provided with a discharge pipe 120 where a first discharge part 121 which is connected to the input part 110 and through which food waste is discharged is formed and where a second discharge part 122 through which water is discharged is formed.

At this time, a corrugated part 123 having a spiral shape is formed on each outer circumference of the first discharge part 121 and the second discharge part 122 of the discharge pipe 120 so that the discharge pipe 120 is capable of being bent in all directions. That is, as the corrugated part 123 is capable of being folded or unfolded in a vertical direction, a length of the corrugated part 123 is capable of being controlled. Furthermore, as the corrugated part 123 is capable of being bent in all directions while being in an unfolded state, the corrugated part 123 is capable of being easily constructed according to construction conditions.

In addition, the hopper part 100 is provided with a first opening and closing lid 130 which is coupled inside the input part 110 such that the first opening and closing lid 130 is capable of being locked or released by a locking means 170 and which is opening and closing the input part 111.

Meanwhile, preferably, a handle protrusion 131 that can be held with fingers protrudes on an upper surface of the first opening and closing lid 130.

In addition, the hopper part 100 may further include a waste receiving drum 140 which is detachably mounted on the input part 110 and in which food waste is accommodated. Furthermore, a rotation handle 141 having a semicircular shape is hinge-coupled to an inner border of an upper portion of the waste receiving drum 140 such that the rotation handle 141 is capable of being rotated, and a plurality of drainage apertures 142 through which water is discharged is formed in one side of a bottom surface of the waste receiving drum 140.

In addition, the hopper part 100 may further include a second opening and closing lid 150 that is opening and closing an opened upper portion of the input part 110, and a handle groove 151 is formed in an upper surface of the second opening and closing lid 150 so that the second opening and closing lid 150 can be held with fingers.

Meanwhile, preferably, a sealing member 160 increasing watertightness so that water leakage is prevented is provided between the second opening and closing lid 150 and the input part 110.

As illustrated in FIG. 5, the locking means 170 includes a locking protrusion 171 that protrudes on an outer border of the first opening and closing lid 130, and includes a locking groove 172 formed in an inner circumference of the input hole 111 such that the locking protrusion 171 is inserted into or separated from the locking groove 172 according to left and right rotation directions.

That is, by rotating the first opening and closing lid 130 covering the input hole 111 in left and right directions, the locking protrusion 171 is inserted into or separated from the locking groove 172, so that the first opening and closing lid 130 is coupled such that the first opening and closing lid 130 is capable of being fixed or released.

In addition, the hopper part 100 is provided with an operating means 180 capable of automatically operating the food waste disposal apparatus 10 that is in a standby mode.

As illustrated in FIG. 6, the operating means 180 includes a magnet part 181 mounted at a lower end portion of the first opening and closing lid 130, and includes a magnetic force detecting sensor 182 which is mounted at a lower end portion of the input part 110 and which detects a magnetic force of the magnet part 181, thereby performing the standby mode, an operating mode, an operation start mode, and a pause mode.

In more detail, the standby mode is a state in which the first opening and closing lid 130 is initially locked on the input part 110 by the locking means 170. At this time, the magnet part 181 provided at the first opening and closing lid 130 is provided such that the magnet part 181 is positioned on the same line of the magnetic force detecting sensor 182 provided at the input part 110, so that the magnet part 181 is sensed by the magnetic force detecting sensor 182.

Then, after the first opening and closing lid 130 in the locked state in the standby mode is released from being locked by rotating the first opening and closing lid 130, when the first opening and closing lid 130 is separated from the input part 110 so that the magnet part 181 is separated from a detecting region of the magnetic force detecting sensor 182, the food waste disposal apparatus 10 enters into in the operating mode.

In addition, in the operating mode state, after food waste is input through the input part 110 and then the first opening and closing lid 130 is locked on the input part 110 by using the locking means 170, the magnet part 181 is introduced into the detecting region of the magnetic force detecting sensor 182, so that the food waste disposal apparatus 10 is operated.

Meanwhile, during operating the food waste disposal apparatus 10, when the first opening and closing lid 130 is separated and the magnet part 181 is separated from the detecting region of the magnetic force detecting sensor 182, the operation of the food waste disposal apparatus 10 is paused for securing safety.

The first transferring part 200 is provided below the hopper part 100 and is configured to transfer food waste to the compressing, transferring, and cutting part 300, in which the food waste is input through the hopper part 100. Furthermore, the first transferring part 200 includes a horizontal transferring screw 210 disposed such that the horizontal transferring screw 210 is capable of being rotated in a horizontal direction, and includes a first motor 220 configured to rotate the horizontal transferring screw 210.

The compressing, transferring, and cutting part 300 is configured to compress food waste that is introduced into an inner portion of the compressing, transferring, and cutting part 300 through the first transferring part 200, and is configured to cut the food waste while moving the food waste in the vertical direction. As illustrated in FIGS. 8 and 9, the compressing, transferring, and cutting part 300 includes: an accommodating container 310 having a first accommodating part 311 in which food waste discharged from the first discharge part 121 is accommodated and which has a lower end portion provided with a mounting hole 311a, the accommodating container 310 having a second accommodating part 312 in which water discharged from the second discharge part 122 is accommodated, and the accommodating container 310 having a partitioning wall 313 formed between the first accommodating part 311 and the second accommodating part 312; the horizontal transferring screw 210 which is mounted in the mounting hole 311a of the first accommodating part 311 in a horizontal direction and which is configured to transfer food waste to the second accommodating part 312; a vertical transferring screw 330 which is axially mounted in an inner bottom surface of the second accommodating part 312 in a vertical direction and which is configured to transfer the food waste transferred to the second accommodating part 312 in an upward direction; a transferring cover part 340 which is configured such that the transferring cover part 340 surrounds an outer side of the vertical transferring screw 330 and which is configured to guide the food waste to be smoothly transferred upward by a rotational force of the vertical transferring screw 330; a cutting part 350 which is disposed at an upper portion of the vertical transferring screw 330 and which is configured to cut the food waste that is transferred upward through the vertical transferring screw 330; an accommodating container cover part 360 which covers an opened upper portion of the accommodating container 310 and which has a transferring wing cover 361 and a discharge pipe connection hole 362; a transferring wing 370 which is axially mounted inside the transferring wing cover 361 of the accommodating container cover part 360 and which is configured to transfer the food waste to the drying and discharging part 400; and a first rotation driving part 380 configured to rotate the vertical transferring screw 330 and the transferring wing 370.

A plurality of water overflowing prevention grooves 313a is formed in an upper portion of the partitioning wall 313 so that water is moved and discharged to the second accommodating part 312 when a situation in which the first accommodating part 311 is fully filled with food waste and water fills the first accommodating part 311 occurs.

A plurality of guide reinforcing ribs 314 may be formed along a longitudinal direction of an outer side surface of the accommodating container 310, in which the plurality of guide reinforcing ribs 314 is capable of guiding a long bolt (not illustrated in the drawings) that is for fixing the accommodating container 310 above a collecting container 800 to be smoothly bolt-fastened, and the plurality of guide reinforcing ribs 314 is also capable of reinforcing a supporting force of the long bolt.

A drainage pipe 315 configured to discharge water is provided at a lower portion of the accommodating container 310. Preferably, such a drainage pipe 315 is a U trap pipe so as to prevent backflow of water or to prevent odor from moving upward.

Preferably, the vertical transferring screw 330 is disposed in a vertical direction so that the vertical transferring screw 330 moves the food waste introduced into the hopper part 100 upward while water contained in the food waste can fall down smoothly.

The transferring cover part 340 includes a guide cover 341 which surrounds an upper outer portion of the vertical transferring screw 330 and which guides transferring of the food waste, and includes a dewatering cover 342 which surrounds a lower outer portion of the vertical transferring screw 330 and which is dewatering water contained in the food waste.

A cutter mounting groove 341a is formed in an upper inner border of the guide cover 341 so that a second cutter 352 of the cutting part 350 is fixed and mounted therein, and a plurality of guide rail 341b guiding the food waste to be smoothly transferred by a rotation driving of the vertical transferring screw 330 is formed along a longitudinal direction of the guide cover 341 on an inner circumference of the guide cover 341.

Meanwhile, sealing members 341*c* for preventing water leakage may be respectively provided at upper and lower inner borders of the guide cover 341.

The dewatering cover 342 has a lower first side provided with a connection hole 342*a* such that the dewatering cover 342 is connected to the horizontal transferring screw 210, and is provided with a plurality of dewatering apertures 342*b* through which water is discharged.

The cutting part 350 includes a first cutter 351 which is mounted on an upper end of a shaft of the vertical transferring screw 330 and which is configured to be rotated together with the vertical transferring screw 330, and includes a second cutter 352 fixed and mounted in the cutter mounting groove 341*a* that is formed on the upper inner border of the guide cover 341 of the transferring cover part 340.

At this time, the second cutter 352 is provided with a plurality of cutting protrusion pieces 352*a* formed in all directions, and a cutting surface 352*b* having an uneven surface for more smoothly cutting the food waste is formed on each opposite border of the plurality of cutting protrusion pieces 352*a*.

A discharge port 361*a* through which the food waste that is finely cut by the cutting part 350 is discharged is formed in a first side of the transferring wing cover 361 of the accommodating container cover part 360, and an inlet port 361*b* configured to introduce the food waste that is discharged through the discharge port 361*a* into the drying and discharging part 400 is formed in a second side of the transferring wing cover 361 of the accommodating container cover part 360.

Meanwhile, between the accommodating container cover part 360 and the cutting part 350, a damage prevention plate 390 that is in close surface contact with an upper surface of the first cutter 351 is provided so as to prevent the accommodating container cover part 360 from being worn and damaged as the first cutter 351 is rotated while being in close contact with the accommodating container cover part 360.

The first rotation driving part 380 includes: a second motor 381 which is fixed to a first side of the accommodating container 360 and which is rotated; a first chain gear 382 which is mounted on an upper end of a shaft of the second motor 381 and in which a 1-1 chain gear 382*a* and a 1-2 chain gear 382*b* are provided side by side in the vertical direction; a second chain gear 383 mounted on an upper end of a shaft of the transferring wing 370; a third chain gear 384 mounted on the upper end of the shaft of the vertical transferring screw 330; a first chain 385 connected to the 1-1 chain gear 382*a* and the third chain gear 384; and a second chain 386 connected to the 1-2 chain gear 382*b* and the second chain gear 383.

Meanwhile, the first rotation driving part 380 may be provided with a shaft fixing plate 387 that holds the first rotation driving part 380 so that the shaft of the second motor 381, the shaft of the transferring wing 370, and the shaft of the vertical transferring screw 330 are smoothly rotated without shaking.

That is, since the transferring wing 370 and the vertical transferring screw 330 are separately connected to the second motor 381 and are separately driven, power is dispersed, so that the second motor 381 is prevented from being overloaded. Furthermore, since a situation in which components are deformed by vibrational shaking is prevented, the transferring wing 370 and the vertical transferring screw 330 are smoothly rotated and are easily transferring and cutting the food waste.

The drying and discharging part 400 is configured to dry and discharge the food waste which is compressed (naturally dewatering) and cut and which is introduced into the inner portion of the drying and discharging part 400 through the compressing, transferring, and cutting part 300. As illustrated in FIGS. 11 and 12, the drying and discharging part 400 includes: a first drying drum 410 having a center of a bottom surface provided with a first discharge hole 411 through which the food waste is discharged and having a lower end portion provided with a first heater 412 heating the food waste; a second drying drum 420 having a center of an inner bottom surface provided with a mounting groove 421 in which a rotary shaft 430 is mounted and having a ventilation aperture 422 through which air flows provided at an outer periphery of the mounting groove 421, the mounting groove 421 having a first side provided with a second discharge hole 423 through which the food waste is discharged, the second drying drum 420 having a lower end portion provided with a second heater 424 heating the food waste; the rotary shaft 430 vertically and axially mounted in the mounting groove 422 of the second drying drum 420 such that the rotary shaft 430 is capable of being rotated; a second rotation driving part 440 configured to rotate the rotary shaft 430; a stirring means 450 including a first stirring member 451 which is mounted on an upper portion of the rotary shaft 430 and provided inside the first drying drum 410 and which is configured to stir the food waste, the stirring means 450 including a second stirring member 452 which is mounted on a lower portion of the rotary shaft 430 and provided inside the second drying drum 420 and which is configured to stir again the food waste that is discharged from the first drying drum 410; a drying drum cover part 460 which covers an opened upper end of the first drying drum 410 and which has a first side of an upper end portion provided with an air discharging port 461, the air discharging port 461 having a lower end provided with a rotation catching step 462; and an opening and closing means 470 which is provided with an opening and closing plug 471 that opens and closes the second discharge hole 423 of the second drying drum 420 and which is provided with a fourth motor 472 configured to rotate the opening and closing plug 471.

A first cutting protrusion 413 and a second cutting protrusion 414 that are for preventing the food waste from being agglomerated during stirring the food waste with the first stirring member 451 may be respectively provided at the inner bottom surface and a first side of an outer side surface of the first drying drum 410.

The second rotation driving part 440 includes: a third motor 441 which is fixed to a first side of the drying drum cover part 460 and which rotates; a first shaft gear 442 which is mounted on a shaft of the third motor 441 and which is configured to be rotated; and a second shaft gear 443 which is mounted on an upper end of the rotary shaft 430 and which is engaged with the first shaft gear 442, thereby being rotated together with the first shaft gear 442.

That is, the rotary shaft 430 to which the first stirring member 451 and the second stirring member 452 are separately fixed is not directly connected to the third motor 441, and is connected such that the first shaft gear 442 mounted on the rotary shaft 430 and the second shaft gear 443 mounted on the third motor 441 are engaged with each other and are rotated together. Therefore, heat generated from the rotary shaft 430 by being exposed to heat of the first heater 412 and the second heater 424 is minimized from being transferred to the third motor 441, so that the third motor 441 is capable of being prevented from being loaded.

A first stirring wing 451a stirring the food waste by being in contact with the food waste is formed on each opposite side of the first stirring member 451.

The second stirring member 452 is provided with a plug part 452a that prevents the food waste which is discharged through the first discharge hole 411 of the first drying drum 410 and which falls down from being introduced into the ventilation aperture 422, and a second stirring wing 452b is stirring the food waste by being in contact with the food waste is formed on each opposite side of the plug part 452a.

At this time, any one of the second stirring wings 452b that are formed on the opposite sides of the plug part 452a may be disposed in the horizontal direction and other of the second stirring wings 452b may be disposed in the vertical direction. Furthermore, a vertical protrusion 452b-1 may protrude in the vertical direction on a center of the second stirring wing 452b that is disposed in the horizontal direction, and a horizontal protrusion 452b-2 may protrude in the horizontal direction on a center of the second stirring wing 452b that is disposed in the vertical direction.

In addition, the drying and discharging part 400 further includes a backflow prevention plate 463 which is hinge-coupled to a lower portion of the air discharging port 461 of the drying drum cover part 460 and which prevents the food waste stirred inside the first drying drum 410 from backflowing to the air discharging port 461, the backflow prevention plate 463 being configured to push the food waste such that the food waste is not accumulated on the upper portion of the first stirring member 451.

At this time, a plurality of air discharging apertures through which air is discharged is formed in a first surface of the backflow prevention plate 463.

In addition, the drying and discharging part 400 may further include a temperature sensor part 480 for automatically controlling temperatures of the first heater 412 and the second heater 424.

The temperature sensor part 480 is provided with a temperature control sensor 481 which is provided at the upper end portion of the drying drum cover part 460 and which is configured to measure temperatures of the first drying drum 410 and the second drying drum 420 in real-time and to control temperatures of the first heater 412 and the second heater 424.

In addition, the temperature sensor part 480 may be provided with an auxiliary temperature sensor 482 which is provided at a first side of the temperature control sensor 481 and which is configured to detect an operation state of the temperature control sensor 481 and to stop the first heater 412 and the second heater 424 when the temperature control sensor 481 is broken down.

The opening and closing means 470 prevents the food waste from being discharged to the second discharge hole 423 during drying the food waste from inside the second drying drum 420. Furthermore, since the opening and closing means 470 opens the second discharge hole 423 by rotating the opening and closing plug 471 when the drying of the food waste is finished, the dried food waste is discharged to the collecting container 800.

In addition, the drying and discharging part 400 further includes an opening and closing control means 490 for automatically controlling the operation of the opening and closing means 470.

The opening and closing control means 490 includes a sensor detecting member 491 which is configured to be rotated by being fixed and coupled to the upper end portion of the rotary shaft 430 and which has a border provided with a sensor detecting part 491a and a sensor non-detecting part 491b, and includes a motor control sensor 492 which is provided at the upper portion of the drying drum cover part 460 and which is configured to drive the fourth motor 472 of the opening and closing means 470 as the sensor detecting part 491a of the sensor detecting member 491 is detected.

That is, in the opening and closing control means 490, when the sensor detecting part 491a is detected by being positioned on the motor control sensor 492 as the sensor detecting member 491 is rotated while discharging the dried food waste in the second drying drum 420, the motor control sensor 492 stops the third motor 441 so that the rotation of the second stirring member 452 is stopped and, at the same time, the motor control sensor 492 operates the fourth motor 472 so that the opening and closing plug 471, thereby opening the second discharge hole 423.

Accordingly, in a state in which the second stirring member 452 is rotated, the opening and closing plug 471 is rotated, so that a problem that the second stirring member 452 and the opening and closing plug 471 collide with each other and are damaged is prevented.

The air discharging part 500 is configured to transfer water vapor and odor that are generated in the drying and discharging part 400 to the deodorizing and exhausting part 600. As illustrated in FIGS. 10 and 11, such an air discharging part 500 includes: a first air discharging pipe 510 which has a first end portion connected to an upper end portion of the air discharging port 461 that is formed in the drying drum cover part 460 of the drying and discharging part 400 and which has a second end portion provided with a first coupling port 511; a second air discharging pipe 520 which has a first end portion connected to the deodorizing and exhausting part 600 and which has a second end portion provided with a second coupling port 521 that is coupled to the first coupling port 511; and an exhaust fan 530 provided between the first coupling port 511 and the second coupling port 521.

Meanwhile, length control parts 512 and 522 may be respectively provided on outer circumferences of the first coupling port 511 and the second coupling port 521 so that length of each of the first coupling port 511 and the second coupling port 521 is capable of being controlled by folding or unfolding the length control parts 512 and 522.

In addition, a first insertion groove 511a into which the exhaust fan 530 is inserted is provided at an inner side of the first coupling port 511, and a second insertion groove 521a into which the first coupling port 511 is inserted is formed at an inner side of the second coupling port 521.

Therefore, in a state in which the exhaust fan 530 is inserted into the first insertion groove 511a of the first coupling port 511, the first coupling port 511 is in a state of being inserted into and coupled to the second insertion groove 521a of the second coupling port 521.

That is, the air discharging part 500 is spacing the exhaust fan 530 away from the drying and discharging part 400 having high temperature, so that the air discharging part 500 prevents the exhaust fan 530 from being broken down by high temperature heat. At the same time, the first coupling port 511 and the second coupling port 522 that are formed of a rubber material double surround the exhaust fan 530, so that vibration and noise are minimized.

The deodorizing and exhausting part 600 is configured to remove water vapor and odor that are introduced through the air discharging part 500. As illustrated in FIGS. 12 to 15, such a deodorizing and exhausting part 600 includes: a deodorizing means 610 which is connected to the air discharging part 500 and which is configured to discharge introduced high temperature water vapor containing odor after the deodorizing means sprays water to the introduced high temperature water vapor containing odor so that the introduced high temperature water is condensed, thereby removing odor; an exhaust means 620 which is connected to the deodorizing means 610 and which is configured to remove odor again by discharging air introduced from the deodorizing and exhausting part 610 to the outside after purifying the air with a filter; and a connection pipe 630 configured to supply water to the deodorizing and exhausting part 600.

The deodorizing means 610 is provided with a deodorizing and removing container 611 having an internal space.

A water vapor inlet port 612 which is connected to the second air discharging pipe 520 and into which water vapor containing odor is introduced is formed in a first side of an upper end of the deodorizing and removing container 611, and a spray nozzle connection port 613 to which a spray nozzle 730 of an odor cleaning part 700 that will be described later is connected is formed in a first side of the water vapor inlet port 612.

A water discharging port 614 to which water sprayed from the spray nozzle 730 is discharged is formed in a lower end of the deodorizing and removing container 611. At this time, the water discharging port 614 is connected to the drainage pipe 312 through a discharge hose 614*a*.

An air discharging port 615 to which air containing odor is discharged is formed in an outer side surface of the deodorizing and removing container 611.

The exhaust means 620 is provided with an exhausting and purifying container 621 having an internal space.

An air inlet port 622 which is connected to the air discharging port 615 of the deodorizing and removing container 611 through the connection pipe 630 and into which air containing odor discharged from the air discharging port 615 is introduced is formed in a first side of a lower portion of the exhausting and purifying container 621, a purifying filter 623 filtering the air containing odor introduced into the air inlet port 622 is provided at an inner portion of the exhausting and purifying container 621, and at least one air discharging port 624 discharging purified air that is filtered by the purifying filter 623 to the outside is formed in the first side of an upper portion of the exhausting and purifying container 621.

Meanwhile, an activated carbon filter may be used as the purifying filter 623, but is not limited thereto. Furthermore, any filter that can purify air may be applied as the purifying filter 623.

In addition, a corrugated part 631 having a spiral shape may be formed on an outer circumference of a first end portion of the connection pipe 630 such that the connection pipe 630 is capable of being bent in all directions. Therefore, a length of the connection pipe 630 is capable of being controlled as the corrugated part 631 is folded or unfolded, and also the connection pipe 630 is capable of being easily assembled according to construction conditions since the corrugated part 631 is capable of being bent in all directions.

That is, the deodorizing and exhausting part 600 firstly removes water vapor containing odor by spraying water mist to high temperature water vapor containing odor generated from the drying and discharging part 400, and secondarily purifies and removes air containing odor, so that odor is capable of being completely removed and also water vapor is prevented from being generated in the sink.

The odor cleaning part 700 is configured to perform condensing, purifying, and cleaning functions by supplying and spraying water to the deodorizing and exhausting part 600. Furthermore, the odor cleaning part 700 includes: a water supplying hose 710 configured to supply water; a solenoid valve 720 configured to open and close a flow path of the water supplying hose 710; and a spray nozzle 730 configured to spray water supplied through the solenoid valve 720 into the deodorizing means 610.

At this time, the spray nozzle 730 spray water mist to an inner portion of the deodorizing and removing container 611 into which water vapor containing odor is introduced so as to easily condense and remove the water.

That is, since the odor cleaning part 700 sprays water mist into the deodorizing means 610 through the spray nozzle 730 so that odor is collected and water vapor is condensed and discharged, odor may be removed and also dew condensation situation caused by high temperature water vapor is prevented from occurring inside the sink.

Meanwhile, preferably, at least one cooling fan 900 for discharging heat of the inner portion of the food waste disposal apparatus 10 to the outside so as to cool the food waste disposal apparatus 10 is provided inside the food waste disposal apparatus 10.

The invention claimed is:

1. A food waste disposal apparatus comprising: a hopper part comprising an input part having an input hole into which food waste is input and having a drainage hole to which water is discharged, the hopper part comprising a discharge pipe having a first discharge part connected to the input part and configured to discharge the food waste and having a second discharge part configured to discharge water, the discharge pipe having an outer circumference provided with a corrugated part that has a spiral shape such that the discharge pipe is capable of being bent in all directions;
  a transferring part provided at a lower portion of the hopper part and configured to be rotated by driving a first motor, the food waste being introduced into the hopper part, thereby moving the food waste in a horizontal direction;
  a compressing, transferring, and cutting part configured to compress the food waste introduced therein through the transferring part, to move the food waste in a vertical direction, and to cut the food waste;
  a drying and discharging part configured to dry and discharge the food waste which is compressed and cut and which is introduced therein through the compressing, transferring, and cutting part;
  an air discharging part configured to transfer water vapor and odor that are generated in the drying and discharging part to a deodorizing and exhausting part;
  the deodorizing and exhausting part configured to remove the water vapor and the odor that are introduced through the air discharging part; and
  an odor cleaning part configured to purify and clean the deodorizing and exhausting part by supplying and spraying water to the deodorizing and exhausting part,
  wherein the hopper part comprises:
  a first opening and closing lid which is coupled to an inner side of the input part such that the first opening and closing lid is capable of being fixed to or released from the input part by a locking means and which is configured to open and close the input hole;
  a waste receiving drum mounted in the input hole of the input part and configured to accommodate the food waste; and
  a second opening and closing lid configured to open and close an opened upper portion of the input part, and the locking means comprises:

a locking protrusion that protrudes on an outer border of the first opening and closing; and a locking groove formed in lid an inner circumference of the input hole such that the locking protrusion is capable of being inserted into or separated from the locking groove according to left and right rotation directions.

2. The food waste disposal apparatus of claim 1, wherein the hopper part comprises a control means that is capable of automatically controlling the food waste disposal apparatus in a standby mode, and the control means comprises:

a magnet part mounted on a lower end portion of the first opening and closing lid; and a magnetic force detecting sensor mounted on a lower end portion of the input part and configured to detect a magnetic force of the magnet part.

3. The food waste disposal apparatus of claim 1, wherein the compressing, transferring, and cutting part comprises:

an accommodating container having a first accommodating part in which the food waste discharged from the first discharge part is accommodated and which has a lower end portion provided with a mounting hole, the accommodating container having a second accommodating part in which water discharged from the second discharge part is accommodated, and the accommodating container having a partitioning wall formed between the first accommodating part and the second accommodating part;

a horizontal transferring screw which is mounted in the mounting hole of the first accommodating part in the horizontal direction and which is configured to transfer the food waste to the second accommodating part;

a vertical transferring screw which is axially mounted in an inner bottom surface of the second accommodating part in the vertical direction and which is configured to transfer the food waste transferred to the second accommodating part in an upward direction;

a transferring cover part which is configured such that the transferring cover part surrounds an outer side of the vertical transferring screw and which is configured to guide the food waste to be smoothly transferred upward by a rotational force of the vertical transferring screw;

a cutting part which is disposed at an upper portion of the vertical transferring screw and which is configured to cut the food waste that is transferred upward through the vertical transferring screw;

an accommodating container cover part which covers an opened upper portion of the accommodating container and which has a transferring wing cover and a discharge pipe connection hole;

a transferring wing which is axially mounted inside the transferring wing cover of the accommodating container cover part and which is configured to transfer the food waste to the drying and discharging part; and a first rotation driving part configured to rotate the vertical transferring screw and the transferring wing.

4. The food waste disposal apparatus of claim 3, wherein the cutting part comprises:

a first cutter which is mounted on an upper end of a shaft of the vertical transferring screw and which is configured to be rotated together with the vertical transferring screw; and a second cutter fixed and mounted in a cutter mounting groove that is formed on an upper inner border of the transferring cover part.

5. The food waste disposal apparatus of claim 3, wherein a plurality of guide reinforcing ribs is formed along a longitudinal direction of an outer side surface of the accommodating container, in which the plurality of guide reinforcing ribs is capable of guiding a long bolt that is for fixing the accommodating container to be smoothly bolt-fastened, and the plurality of guide reinforcing ribs is also capable of reinforcing a supporting force of the long bolt.

6. The food waste disposal apparatus of claim 1, wherein the drying and discharging part comprises:

a first drying drum having a center of a bottom surface provided with a first discharge hole through which the food waste is discharged, the first drying drum having a lower end portion provided with a first heater heating the food waste;

a second drying drum having a center of an inner bottom surface provided with a mounting groove in which a rotary shaft is mounted, the second drying drum having a ventilation aperture through which air flows provided at an outer periphery of the mounting groove, the mounting groove having a first side provided with a second discharge hole through which the food waste is discharged, and the second drying drum having a lower end portion provided with a second heater heating the food waste;

the rotary shaft vertically and axially mounted in the mounting groove of the second drying drum such that the rotary shaft is capable of being rotated;

a second rotation driving part configured to rotate the rotary shaft;

a stirring means comprising a first stirring member which is mounted on an upper portion of the rotary shaft and provided inside the first drying drum and which is configured to stir the food waste, the stirring means comprising a second stirring member which is mounted on a lower portion of the rotary shaft and provided inside the second drying drum and which is configured to stir again the food waste that is discharged from the first drying drum;

a drying drum cover part which covers an opened upper end of the first drying drum and which has a first side of an upper end portion provided with an air discharging port, the air discharging port having a lower end provided with a rotation catching step; and an opening and closing means which is provided with an opening and closing plug that opens and closes the second discharge hole of the second drying drum and which is provided with a fourth motor configured to rotate the opening and closing plug.

7. The food waste disposal apparatus of claim 6, wherein a backflow prevention plate which is capable of being rotated and which is configured to prevent the food waste stirred inside the first drying drum from backflowing to the air discharging port is provided at the rotation catching step of the drying drum cover part.

8. The food waste disposal apparatus of claim 6, wherein the drying and discharging part is provided with a temperature sensor part for automatically controlling temperatures of the first heater and the second heater.

9. The food waste disposal apparatus of claim 6, wherein the drying and discharging part comprises an opening and closing control means for automatically controlling an operation of the opening and closing means, and the opening and closing control means comprises:

a sensor detecting member which is configured to be rotated by being fixed and coupled to an upper end portion of the rotary shaft and which has a border provided with a sensor detecting part and a sensor non-detecting part; and a motor control sensor which is provided at an upper portion of the drying drum cover part and which is configured to drive the fourth motor of the opening and closing means as the sensor detecting part of the sensor detecting member is detected.

10. The food waste disposal apparatus of claim 1, wherein the air discharging part comprises:

a first air discharging pipe having a first end portion connected to the drying and discharging part and having a second end portion provided with a first coupling port;

a second air discharging pipe having a first end portion connected to the deodorizing and exhausting part and having a second end portion provided with a second coupling port that is coupled to the first coupling port; and an exhaust fan provided between the first coupling port and the second coupling port.

11. The food waste disposal apparatus of claim 1, wherein the deodorizing and exhausting part comprises:

a deodorizing means connected to a second air discharging pipe of the drying and discharging part and configured to discharge introduced high temperature water vapor containing odor after the deodorizing means sprays water to the introduced high temperature water vapor containing the odor so that the introduced high temperature water is condensed, purified, and cleaned, thereby removing the odor; and an exhaust means connected to the deodorizing means and configured to remove the odor again by discharging air introduced from the deodorizing means to an outside after purifying the air with a filter.

12. The food waste disposal apparatus of claim 1, wherein the odor cleaning part comprises:

a water supplying hose configured to supply water;

a solenoid valve configured to open and close a flow path of the water supplying hose; and a spray nozzle configured to spray water supplied through the solenoid valve into a deodorizing means.

* * * * *